June 17, 1958 H. W. MOYER 2,839,608

TELEPHONE SIGNALING DEVICE

Filed May 12, 1954 2 Sheets-Sheet 1

June 17, 1958 H. W. MOYER 2,839,608

TELEPHONE SIGNALING DEVICE

Filed May 12, 1954 2 Sheets-Sheet 2

United States Patent Office 2,839,608

Patented June 17, 1958

2,839,608

TELEPHONE SIGNALING DEVICE

Harold W. Moyer, Laurys Station, Pa., assignor of one-half to Leon A. Marsh, Walnutport, Pa.

Application May 12, 1954, Serial No. 429,243

6 Claims. (Cl. 179—5)

This invention relates generally to the field of alarm devices, and more particularly to a telephone signaling device adapted to send a warning or alarm message over telephone lines to a distant point. The invention contemplates a device which in the event of an emergency such as fire, theft, power interruption, water leakage and the like, will dial a telephone number and upon lifting of the instrument of the station which has been dialed, a buzz or other signal in the receiver will indicate the nature of the emergency.

It is among the principal objects of the present invention to provide a device of the class described which will perform the above-described signaling in a completely automatic manner at repeated intervals over an extended period of time, with periods of interruptions during which time the telephone station which has been called may be used for necessary outgoing calls.

Another object of the invention lies in the provision of a telephone signaling device which may alternately dial a plurality of predetermined telephone numbers, thereby permitting the responsible party to be reached at any one of a plurality of locations.

A further object of the invention lies in the provision of a telephone signaling device capable of the above-described functions in which the number of moving parts has been reduced to a minimum, thereby permitting simplified servicing, and operation from a self-contained source of electromotive force, thereby making the device independent of power failure.

Still another object of the invention lies in the provision of a telephone signaling device of the class described in which the cost of fabrication may be of a reasonably low order, with consequent wide sale, distribution and use.

A feature of the invention lies in the fact that no external current is sent over the telephone lines, thereby permitting the telephone receiver to which the device is attached to function in an ordinary and normal manner.

Another feature of the invention lies in the fact that the device is capable of sending a wide variety of signals over the telephone lines to indicate specific types of emergencies so that the person receiving the signal is in a position to take whatever action is appropriate or necessary.

A further feature of the invention lies in the fact that the entire device may be constructed, with the exception of some few parts of standard electrical parts which are well-known in the art, thereby permitting the manufacture of the same with a minimum of tooling costs and the like.

These objects and features, as well as other incidental ends and advantages, will become more fully apparent during the course of the following disclosure, and be pointed out in the appended claims.

Figure 1A:
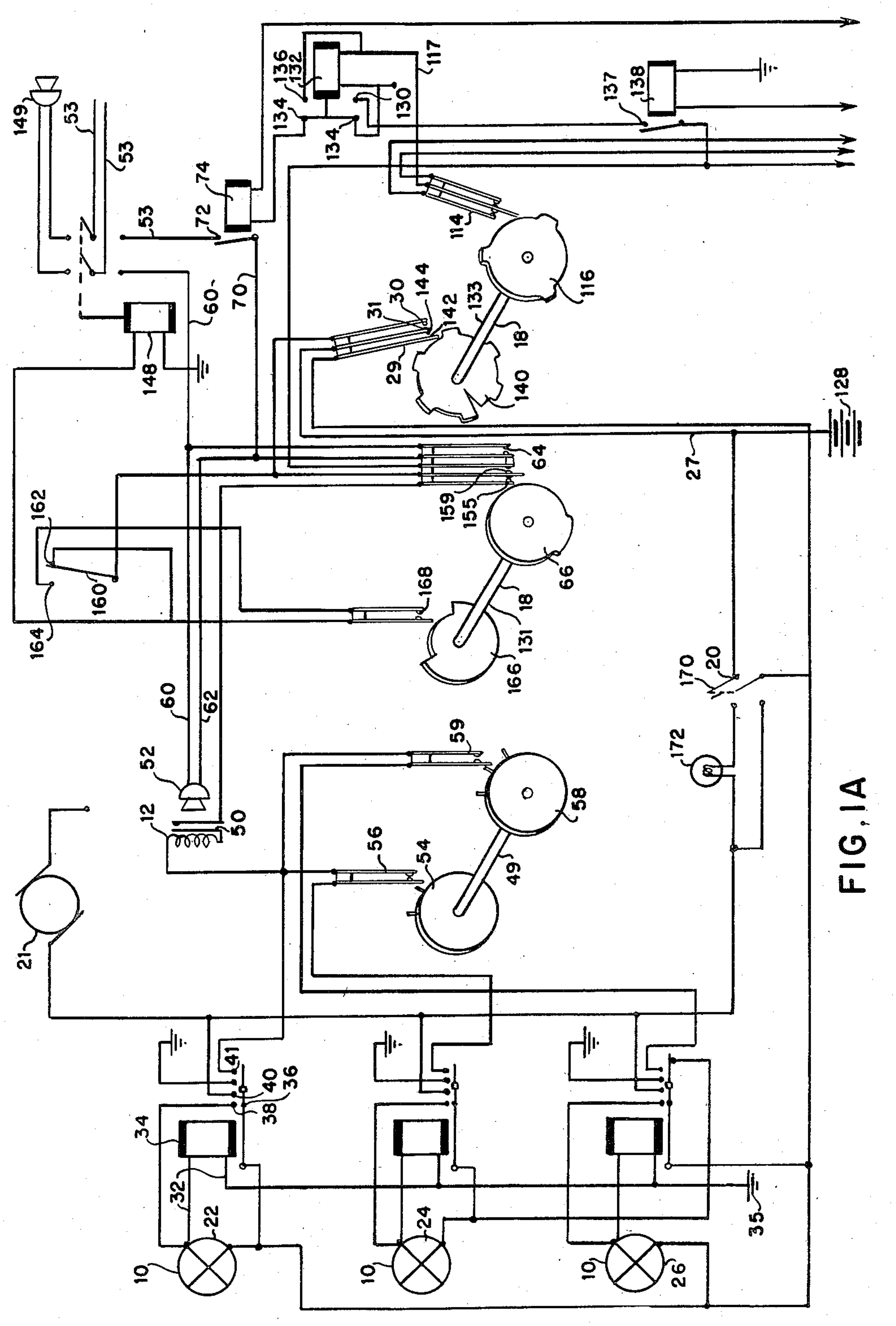
Figure 1B:
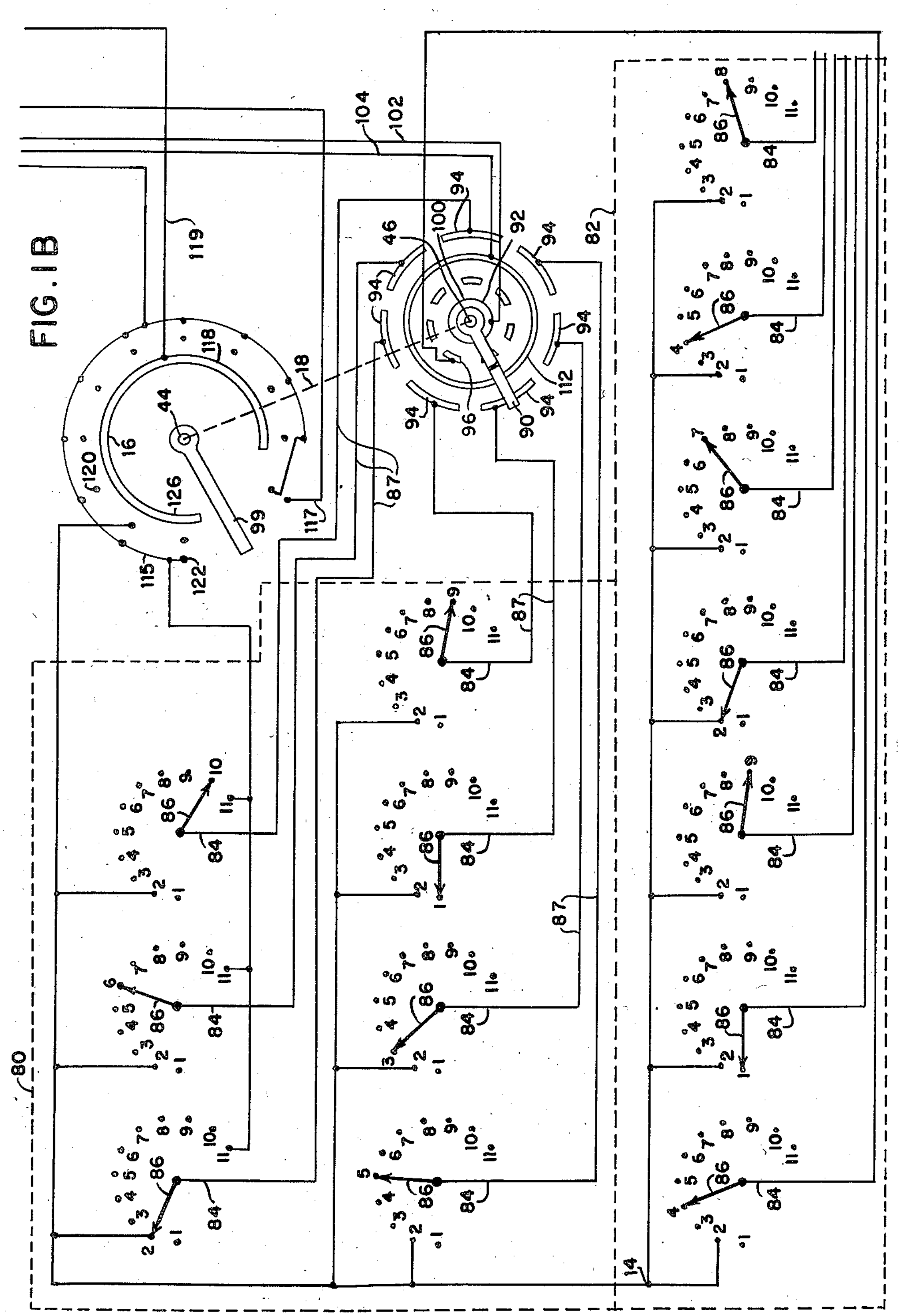

On the drawing, to which reference will be made in the specification, Figure 1 is a schematic diagram of an embodiment of the invention.

Before entering into a detailed description of the elements comprising the embodiment, a detailed description of the exact function of the device is believed in order.

The use of the device contemplates installation in a deserted place of business or plant otherwise unguarded by watchmen or the like. Emergency switch elements are installed at various points in the plant or establishment, which switches are actuated by the occurrence of various emergencies, as for example fire, burglary, power failure, water leakage, or any of a number of dangerous emergencies. Emergency switches of similar types are wired together in parallel to the device, so that any of the switches of the same type, upon being closed or actuated, will produce a similar result. The various types of switches are connected at different points on the device, and when actuated, the device will commence to dial a predetermined telephone number for a period of two minutes, or until the telephone receiver dialed is lifted. The device will then send the predetermined signal indicating a particular type of emergency for the completion of the two minute period, after which the device will perform the equivalent of "hanging up" the receiver at the dialing station. A rest period of three minutes then follows, during which time the recipient of the signal may make whatever calls he deems necessary, after which the cycle is repeated. If desired, provision may be made so that upon the repetition of the cycle a telephone number different from that first called will be dialed by the device, so that the same signal may be transmitted to another location. These cycles of alternate dialing, sending the signal followed by the rest period are repeated for approximately one half hour, after which the device automatically discontinues operation. Upon remedying the emergency which originally actuated the device the same may be reset for repeated operation. In sending the desired signal, no external current is sent over the telephone lines, the self-contained source of power within the device being only used to originate a signal corresponding to the human voice for controlling a carbon microphone, and for imparting motion to the various components of the device requiring the same.

In accordance with the invention, the device comprises broadly: a plurality of switch elements 10, a signal generating element 12, a telephone number selector element 14, a telephone number dialing element 16, timing means 18, and reset means 20, the elements 14 to 20, inclusive, being driven by prime mover means 21.

The switch elements 10 may be of a variety of types, depending upon the type of actuation required. For example, the fire thermostat switch 22 may be of a simple thermostatic type actuated by the presence of excessive heat. The burglar switch 24 may be attached to a door or window, the circuit being completed by the opening of the door or window. The power failure switch 26 may be of a spring operated type employing a magnet, interruption of power causing the magnet to be deenergized and permitting the spring to close the circuit. The switch elements form no part of the present invention, and are therefore not shown in detail upon the drawing.

Upon the closing of the fire thermostat 22, current from the battery 28 flows through conductors 27 to the switch 29, in which the contacts 30 and 31 are normally in a closed position. Current flows through the conductors 32 to the solenoid coil 34, and thence to the grounded terminal 35 to return to the battery 28. The battery may be in any suitable form, as for example dry cells (not shown). The energizing of the coil 34 results in closing of the terminals 36 and 38, which maintains the solenoid in its actuated position, and also closes the terminals 38 and 40. Current flows through the terminal 40 to the prime mover 21, which is in the form of a subfractional horsepower electric motor. The prime mover element continues to run during the entire half hour series of cycles described above.

The prime mover element rotates a first shaft 44, and a second shaft 46 at one seventh the angular velocity of the shaft 44, the purpose of which will more fully appear hereinafter.

Current also flows through the terminal 41 to a small electric buzzer 50, which produces a continuous buzzing noise, which in turn controls a carbon microphone 52 connected across the telephone line 53. Thus current from the battery is not introduced into the telephone line, and the current flowing through the microphone is the usual telephone voltage.

The operation of the switches 24 and 26 are generally similar, but in the case of the switch 24, current flow is controlled by a cam 54 which opens and closes switch 56. A similar cam 58 controls switch 59 through which current flows when the emergency switch 26 is actuated. Cams 54 and 58 are driven directly by the shaft 44, and differ only in the number of lobes which open and close the switches, thereby providing different buzzing symbols.

When actuated, the buzzer 50 controls current flowing through the microphone 52 and wires 60 and 62 to be connected across the telephone line 53 during operation. During dialing of the numbers, the contacts 64 short out the microphone under control of a cam 66 driven by the timing means 18. Upon opening of the contacts 64, current flows through the wire 68, returning through the wire 70 through the contact 72 actuated by solenoid 74.

The telephone number selecting element 14, as has been mentioned, is adapted to alternately dial a pair of different telephone stations, and accordingly, in the embodiment shown there are provided a first bank of dialing switches 80 and a second bank of similar switches 82. The switches of each bank are seven in number, the first three serving to dial the desired exchange, and the last four the numbers of the individual station of that exchange. Each of the switches 84 is of a multi-contact wafer type, having eleven individual terminals numbered 1 to 11 which may be selectively engaged. Although the showing of the individual wires connecting the switches 84 of each bank have been eliminated from the drawing for purposes of clarity, it will be understood that the switches are wired in parallel, terminal 1 of each switch being interconnected, as are all of the other numbers.

The digit selector 92 is in the form of a rotary switch driven by the shaft 46. It includes a set of seven outer terminals 94 which are interconnected one each to the selectors 86 of the corresponding switches 84 of the first bank of switches 80 through wires 87. An inner set of terminals 96 is similarly interconnected to the second bank of switches 82. The sweep arm 90 progressively interconnects the terminals 94 and 96 to either of two collector rings 100 and 112 through which current flows alternately through wires 102 and 104 to the single pole double throw switch 114. The switch 114 is controlled by a cam 116 which alternately interconnects current from either the first or second bank of switches through the wires 117 to the dialing unit 118.

The dialing unit 118 is driven directly from the shaft 44 and is also in the form of a rotating switch. The unit includes a first set of contacts 120 which are interconnected with the wires leading from the individual numbered contacts on the switches 84, a second set of contacts 122 which are interconnected by a single wire 115 across the telephone line 53 as will more clearly appear hereinafter, and a collector bar 126 which completes the circuit across the telephone line through wire 119 and sweep arm 99. It is to be noted that the bar 126 extends only to the first ten of the contacts 120—122, and not to the eleventh contact.

The timing means 18 is in the form of a gear reduction train (not shown) driving the cams 66, 116, 140 and 166. Cams 66 and 166 are both mounted on a single shaft 131 which is driven by the prime mover 21 through gear reduction means (not shown) at an angular velocity of one revolution for each two minutes of operation. The cam 66 is provided with a lobe which extends over 45° of arc of the periphery, representing a time of fifteen minutes. The cam 166 is provided with an indented portion extending over 90° representing a time period of one-half minute. Cams 116 and 140 are similarly mounted upon a single shaft 133 which is driven by the prime mover through gear reduction means (not shown) at an angular velocity of one revolution every thirty minutes. The cam 116 is provided with raised lobes and alternate depressions which are spaced at intervals of 120° of arc representing a six minute interval. The cam 140 is provided with a single deep depression serving to interrupt operation of the device after a passage of one-half hour, and alternate raised lobes of 24° representing the passage of two minute periods, and relatively shallow depressions of 48° representing the passage of four minute periods of time.

The rest means 20 includes a separate switch 170, which upon manual closing, energizes the prime mover 21 and simultaneously an incandescent lamp 172. As both circuits pass through the switch contacts 142 and 144, the circuit is automatically opened when the contacts are opened, so that when the lamp is extinguished, the device is ready to commence a new series of operative cycles. The switch 170 may then be manually opened.

*Operation*

A description of the operation of the device follows, it being assumed that the first and second banks of switches have been present to dial the desired numbers upon commencement of the cycles. The digit selector is at this time positioned to connect the first switch 84 of the first bank of switches 80. It will be observed that current collected is sent through the wire 117 to the relay 132. As the dialing unit cycles, the numeral contacts are slipped over, thereby providing the necessary impulses for dialing to the relay 74 which opens and closes contacts 72 in the telephone line 53. When the number for which the first switch is preset is reached, the relay 132 will be actuated, and prevent further operation of the relay 74 by opening contact 134. This action simultaneously closes contacts 136 which keep the relay 134 energized until the sweep arm 99 reaches contact numbered 11 at which point current is transmitted to the relay 138 which opens contacts 136 to release the relay 132 so that the second or following number may be dialed. This occurs at the time the digit selector has interconnected the second or next succeeding switch 84 of the bank 80.

Where telephone numbers have only four digits, the first three switches 84 may be placed in position 11 so that no dialing will be performed when the digit selector contacts them. During the dialing, the cam 140 holds contact 30, 31 and 142 in shorted position so that current is fed to the relay 148. At the completion of dialing, the cam 66 releases the shorts across the terminals 64 and completes a circuit through terminals 155 and 159. At this point the signal from the buzzer 50 is sent across the line until the cam 140 has revolved to the point where contact 30 is released from contact 31. The relay 148 is then simultaneously released so that the accompanying telephone 149 is again connected across the line. The device is now in the four-minute rest period, until the cam 140 has revolved to a point where the second cycle is commenced. At this point the cam 116 has shifted the digit selector from the first bank of switches 80, to the second bank of switches 82, so that upon subsequent dialing, the telephone number present on the second bank will be dialed. These cycles continue until the cam 140 allows the arm mounting contact 30 to resiliently drop into the deep groove in the cam 140, thereby breaking the contact between the contacts 142 and 31, and interrupting the passage of current to the prime mover 21. At this point the passage of approximately one-half hour has taken place, and the device discontinues further operation.

To call an off-premises extension of the telephone line to which the device is connected, the wafer switches 84, which are not needed, are set on contact 11, and the switch 160 is thrown from contact 162 to contact 164. When the ringback number has been dialed, the cam 166 opens the contacts 168, thereby releasing the relay 148 for a period of one-half minute ringback, after which the cam 166 closes the contact 168 for the remainder of the signaling period.

It may thus be seen that I have invented novel and highly useful improvements in telephone signaling devices, in which there has been provided a comparatively simple economical device which may be connected across a telephone line to permit small plants, homes and places of business to have protection approaching that afforded by a watchman, but at a fraction of the cost. Since the device is powered entirely by batteries, it is possible for the same to function through a power failure, or in the event that power lines are burned away. With the exception of the various cams and gears driving the same, the device may be constructed entirely of electrical parts readily available and well known in the art, thereby permitting the same to be manufactured at a reasonably low cost.

I wish it to be understood that I do not consider the invention limited to the exact details of structure shown and set forth in the specification, for obvious modifications will occur to those skilled in the art to which the present invention pertains.

I claim:

1. A telephone signaling device for use in sending an alarm signal over telephone lines comprising: means for closing an electrical circuit upon the occurrence of a predetermined condition, a signal generating element, a telephone number selecting element, a telephone number dialing element; means for disconnecting said signal generating element from said telephone lines during operation of said telephone number selecting element and said telephone number dialing element, said means including a driven cam.

2. In a telephone signaling device for use in sending an alarm signal over telephone lines, means for dialing preselected telephone numbers comprising: a telephone number selecting element, a digit selector, and a dialing unit; said number selecting element including a plurality of switches, each having a plurality of terminals which may be selectively connected to a common terminal; said common terminals of each switch being connected to said digit selector; said plurality of terminals of each switch being connected in parallel to said dialing unit; said digit selector being in the form of a switch having a plurality of contacts, each of which is interconnected to a common terminal of one of said plurality of switches of said number selecting element and a sweep arm conducting current from said individual switches to said dialing element.

3. A preselective dialing means for use in conjunction with a telephone comprising: a plurality of multi-contact switches, a digit selector and a dialing unit; said switches being of a sufficient number to correspond to the number of digits in a telephone number being dialed, each switch having a plurality of terminals which may be selectively engaged by a selector member; said terminals being connected in parallel to corresponding terminals of said plurality of switches, said selector members being connected to said digit selector; said digit selector including a switch having a plurality of terminals, one each of which is electrically connected to said selector members and a common conductor serving to conduct current to a first relay; said dialing unit including a sweep arm adapted to successively engage a plurality of first contacts which are connected to the individual terminals of said switches, a second plurality of contacts connected in series to a second relay, said second relay being so arranged as to open and close a telephone line; an electrically conductive bar engaged by said sweep arm over a position of its arcuate path of travel, certain of said contacts being so disposed as to be free of interconnection with said bar; a third relay adapted to prevent actuation of said second relay upon contact of said sweep arm which said last-mentioned contacts; said first relay serving to prevent actuation of said second relay upon said sweep arm of said dialing unit contacting a predetermined pair of first and second sets of contacts; said third relay serving to release said second relay for further operation upon contact of other of said sets of contacts by said sweep arm.

4. In a telephone signaling device for use in sending an alarm signal over telephone lines, means for dialing preselected telephone numbers comprising: a telephone number selecting element, a digit selector, and a dialing unit; said number selecting element including a plurality of switches, each having a plurality of terminals which may be selectively connected to a common terminal; said common terminals of each switch being connected to said digit selector; said plurality of terminals of each switch being connected in parallel to said dialing unit; said digit selector being in the form of a switch having a plurality of contacts, each of which is interconnected to a common terminal of one of said plurality of switches of said number selecting element and a sweep arm conducting current from said individual switches to said dialing element; and means for ring back an off premises extension connected to the station adjoining said device.

5. A telephone signalling device for use in sending an alarm signal over telephone lines comprising: means for closing an electrical circuit upon the occurrence of a predetermined condition, a signal generating element, a telephone number selecting element, a digit selector, and a dialing unit; said number selecting element including a plurality of switches, each having a plurality of terminals which may be selectably connected to a common terminal; said common terminals of each switch being connected to said digit selector; said plurality of terminals of each switch being connected in parallel to said dialing unit; said digit selector being in the form of a switch having a plurality of contacts, each of which is interconnected with a common terminal with one of said plurality of switches of said number selecting element and a sweep arm conducting current from said individual switches to said dialing element; and means for disconnecting said signal generating element from said telephone lines during operation of said telephone number selecting element and said dialing unit.

6. A telephone signalling device for use in sending an alarm signal over telephone lines comprising; means for closing an electrical circuit upon the occurrence of a predetermined condition, a signal generating element, a telephone number selecting element, a digit selector, and a dialing unit; said number selecting element including a plurality of switches, each having a plurality of terminals which may be selectably connected to a common terminal; said common terminals of each switch being connected to said digit selector; said plurality of terminals of each switch being connected in parallel to said dialing unit; said digit selector being in the form of a switch having a plurality of contacts, each of which is interconnected with a common terminal with one of said plurality of switches of said number selecting element and a sweep arm conducting current from said individual switches to said dialing element; and means for disconnecting said signal generating element from said telephone lines during operation of said telephone number selecting element and said dialing unit; said means including a driven cam.

References Cited in the file of this patent

UNITED STATES PATENTS

| | | |
|---|---|---|
| 1,956,353 | James | Apr. 24, 1934 |
| 2,452,239 | Huge | Oct. 26, 1948 |
| 2,478,514 | Townley | Aug. 9, 1949 |
| 2,512,981 | Svoekhotoff | June 27, 1950 |
| 2,537,188 | Kaelin | Jan. 9, 1951 |
| 2,542,880 | Ravera | Feb. 20, 1951 |
| 2,555,714 | Talbot | June 5, 1951 |
| 2,576,189 | Olliver | Nov. 27, 1951 |